United States Patent
Hammer

[15] 3,684,778

[45] Aug. 15, 1972

[54] POLYMERS OF ETHYLENE, SULFUR DIOXIDE AND ETHYLENIC MONOMERS

[72] Inventor: Clarence Frederick Hammer, Wilmington, Del.

[73] Assignee: E. I. du Pont de Nemours and Company, Wilmington, Del.

[22] Filed: April 28, 1970

[21] Appl. No.: 32,740

[52] U.S. Cl. ......... 260/79.3 A, 260/13 R, 260/28.5 R, 260/28.5 AS, 260/823, 260/827, 260/836, 260/844, 260/858, 260/859 R, 260/859 PV, 260/873, 260/874, 260/893, 260/897, 260/898, 260/899, 260/901
[51] Int. Cl. .......................... C08f 13/06, C08f 29/00
[58] Field of Search ................................ 260/79.3 A

[56] References Cited

UNITED STATES PATENTS

| | | | |
|---|---|---|---|
| 2,293,023 | 8/1942 | Hills | 260/79.3 A |
| 2,507,526 | 5/1950 | Jacobson | 260/79.3 A |
| 2,943,077 | 6/1960 | de Jong | 260/79.3 A |
| 3,442,790 | 5/1969 | Burkard | 208/28 |
| 3,444,145 | 5/1969 | Youngman | 260/79.3 A |

FOREIGN PATENTS OR APPLICATIONS

| | | | |
|---|---|---|---|
| 528,051 | 10/1940 | Great Britain | 260/79.3 |
| 6,323,040 | 10/1963 | Japan | 260/79.3 |
| 1,356,595 | 2/1964 | France | 260/79.3 |

*Primary Examiner*—Joseph L. Schofer
*Assistant Examiner*—C. A. Henderson, Jr.
*Attorney*—Robert W. Black

[57] ABSTRACT

Essentially random copolymers of ethylene, sulfur dioxide and at least one copolymerizable ethylenically unsaturated organic compound such as vinyl acetate or methyl methacrylate which are essentially free of 1:1 molar ratio of ethylene and sulfur dioxide are provided. Processes for preparing these copolymers are also provided. These copolymers consist essentially of at least about 25 percent by weight ethylene, from about 0.1 to 30 percent by weight of sulfur dioxide and from about 0.1 to 55 percent by weight of at least one of the copolymerizable organic compounds. By varying the amount of the highly polar sulfur dioxide in the copolymer, materials which are blendable with another solid organic polymer such as a vinyl chloride polymer and which possess improved properties such as oil and solvent resistance can be obtained. By varying the amount of the polar copolymer in the blend, shaped articles which are flexible or rigid can be obtained.

16 Claims, No Drawings

3,684,778

POLYMERS OF ETHYLENE, SULFUR DIOXIDE AND ETHYLENIC MONOMERS

BACKGROUND OF INVENTION

1. Field of Invention

This invention relates to ethylene copolymers, processes for their preparation, and compositions and shaped articles formed therefrom. More particularly, this invention relates to ethylene/$SO_2$ terpolymers, bulk polymerization processes for their preparation, and polymeric blends and shaped articles formed therefrom.

2. Prior Art

Ethylene polymers are characterized by being very low in polarity. They are like waxes in this aspect, have a low dielectric constant, and are soluble in hot oils, hot wax and hot hydrocarbons. The addition of various ester groups into the polyethylene chain through copolymerization of un-saturated organic esters such as vinyl acetate, vinyl propionate, acrylates or methacrylates imparts a small degree of polarity to the chain. This polarity can be detected by dielectric measurements and has practical utility in such cases as the ethylene/vinyl acetate copolymers containing about 10 mole percent of vinyl acetate. These resins are useful as adhesives, but the polarity is not very high, as shown by the solubility of such copolymers in oil or wax at 80° to 100°C.

For some uses, it would be desirable to impart more polarity to such copolymers to provide improved adhesion to more polar materials and resistance to hydrocarbon solvents and oils. It is easy to synthesize resins having higher levels of the ester component, ultimately achieving the polymeric ester such as polyvinyl acetate or polymethyl methacrylate. These resins, though, have lost the inherent advantages of the long flexible hydrocarbon chain, low cost, good low temperature behavior, etc. Thus, it is desired to increase the polarity of an ethylene copolymer while retaining the hydrocarbon chain as the major feature of the polymer.

A highly polar monomer which is a candidate for increasing the polarity of polymers is sulfur dioxide; however, copolymerizing sulfur dioxide with ethylenically unsaturated monomers gives resulting copolymers having too much sulfur dioxide present, and thus too much polarity. The reason is found from the extensive history of sulfur dioxide polymerization. It is found in the art that sulfur dioxide does not homopolymerize but must be incorporated with another monomer such as ethylenically unsaturated monomers. The early art teaches that adjacent — $SO_2$ — (sulfone) groups will never be found in polymer chains. Polymers always consisted of alternating units of sulfur dioxide and the ethylenically unsaturated comonomer. Workers in the art invariably reported copolymers having a 1:1 molar ratio of sulfur dioxide and the ethylenically unsaturated comonomer.

Since sulfur dioxide is an abundant and cheap chemical, copolymers were extensively investigated. All such copolymers suffered from some deficiency, such as thermal instability, so that they were not suitable for commercial use, even though the sulfone groups provided some desirable properties. For example, 1:1 molar copolymers of ethylene and sulfur dioxide do not soften or melt until the temperature is so high that the polymers begin to decompose. Thus, it is impossible to extrude or mold such polymers in conventional equipment.

Workers then began studies in an attempt to modify slightly the 1:1 molar composition to provide polymers which could be molded or extruded at suitable lower temperatures. Such polymers are described in U.S. Pat. No. 2,703,793 to Marcus A. Naylor, Jr., issued Mar. 8, 1955, for propylene/sulfur dioxide/acrylate systems; U.S. Pat. No. 2,634,254 to Robert D. Lipscomb, issued Apr. 7, 1953, for combining carbon monoxide in ethylene/sulfur dioxide systems; and U.S. Pat. No. 2,976,269 to Jan. Ide de Jong, issued Mar. 21, 1961, for systems in which the molar ratio was shifted by incorporating long blocks of polyethylene with 1:1 blocks of ethylene/sulfur dioxide. In most of these efforts, however, the polymers still contain large percentages of sulfur dioxide and —S—C—C—S— groups in the polymer chain.

SUMMARY OF THE INVENTION

According to the present invention there is provided an ethylene copolymer consisting essentially of at least about 25 percent by weight ethylene, from about 0.1 to 30 percent by weight of sulfur dioxide and from about 0.1 to 55 percent by weight of at least one copolymerizable, ethylenically unsaturated organic compound.

There is also provided a process for preparing the above copolymer which comprises (1) continuously reacting ethylene, sulfur dioxide and at least one copolymerizable, ethylenically unsaturated organic compound in proportions to provide copolymer consisting essentially of at least about 25 percent by weight ethylene, from about 0.1 to 30 percent by weight sulfur dioxide and from about 0.1 to 55 percent by weight of at least one of said copolymerizable organic compounds, in a pressurized, stirred reaction zone maintained at a temperature of at least 140°C., with a free-radical catalyst wherein the contents throughout the reaction zone are kept uniform with respect to the molar ratio of ethylene, sulfur dioxide and said copolymerizable organic compound, (2) continuously separating the copolymer from unreacted ethylene, sulfur dioxide and said copolymerizable organic compound, and (3) continuously discharging (recycling or venting) said unreacted ethylene, sulfur dioxide and copolymerizable organic compound.

Also provided are shaped articles from the copolymers, polymeric blends of the copolymers and other solid organic polymers, and shaped articles from the blends.

DETAILED DESCRIPTION OF INVENTION

In preparing the copolymers of the present invention, the ethylene, sulfur dioxide and other ethylenically unsaturated copolymerizable organic compound monomers are pumped into a reactor either as a mixed stream, separate streams or combinations thereof. Catalyst as necessary is pumped into these streams or directly into the reactor through a separate line. The reactor is a vessel capable of withstanding high pressures and temperatures, is equipped with a high-speed (at least 0.25 h.p./gal. of reactor volume), motor-driven stirrer and pressure relief valves, and jacketed walls for circulating heating or cooling fluids to control temperatures. The effectiveness of such control depends on the size of the reactor and the amount of heat generated by the polymerization reaction.

A mixture of polymer and monomers leaves the reactor and the pressure is reduced as the mixture flows into a separator. Monomers leave the separator and may be pumped for recycle to the reactor together with make-up ethylene, sulfur dioxide and other ethylenically unsaturated monomers or may be discarded when the reactor size is small. Molten polymer leaves the separator in a stream from which it is cooled and further processed, such as cutting the polymer into suitable sized particles or, if the polymer is tacky, blending it with about 1 to 10 percent by weight of a vinyl chloride polymer, wax or another type of high molecular weight polymer in order to improve its handling characteristics.

The flow of ethylene, sulfur dioxide, other ethylenically unsaturated monomers and catalyst into the reactor is carefully controlled so that they enter the reactor in constant, continuous molar ratios and at the same continuous rate that the product and unreacted monomers are discharged from the reactor. The rates and molar ratios are adjusted so as to provide from about 0.1 to 30 percent by weight sulfur dioxide (about 25 molar percent maximum) and from about 0.1 to 55 percent by weight of the other ethylenically unsaturated monomer, preferably between about 0.1 to 15 percent by weight of sulfur dioxide or between about 15 to 30 percent by weight of sulfur dioxide, in the ethylene copolymer, and, to keep the conversion less than 20 percent, preferably between 5 and 15 percent. Effective stirring is provided in order to keep the reacting monomers in intimate admixture throughout the reactor. The reactor temperature is maintained above about 140°C., preferably a temperature within the range of from 155° to 300°C., most preferably 155° to 225°C., and the reactor pressure can be maintained within the range of 5,000 to 60,000 psi, preferably 20,000 to 40,000 psi.

It is important in preparing the ethylene copolymers of the present invention that the contents of the reactor be kept uniform with respect to the molar ratio of ethylene, sulfur dioxide and third monomer. In other words, the sulfur dioxide in the reactor must never be depleted so that only ethylene and the other ethylenically unsaturated monomers are reacting. Since sulfur dioxide reacts much faster than ethylene, a larger percentage of the sulfur dioxide present reacts than the percentage of the ethylene and other copolymerizable monomers which react in a given time. Consequently, the sulfur dioxide is fed at a lower molar ratio than desired in the final polymer.

Monomers as commercially available are usually of sufficient purity for use in the process. For instance, commercial ethylene and sulfur dioxide of about 100 percent purity are used initially and in supplying the continuous make-up of monomers. Any other ethylenically unsaturated copolymerizable organic compound can be used as the additional monomer or monomers. Typical examples of preferred monomers are alpha-olefins of three to 12 carbon atoms such as propylene, butenes, pentenes, hexenes, heptenes, octenes, and decenes; unsaturated mono- and dicarboxylic acids such as acrylic acid, methacrylic acid, crotonic acid, maleic acid, fumaric acid, itaconic acid and the dicarboxylic acids in which one, or both, of the carboxyl groups has been esterified with alkanols, preferably of one to eight carbon atoms or amidized to contain the NR group wherein R is hydrogen, alkyl of one to eight carbon atoms and cyclic alkyl such as methyl hydrogen maleate and dibutyl maleate; esters of unsaturated carboxylic acids such as the alkyl acrylates and methacrylates wherein the alkyl group is one to 18 carbon atoms, i.e., methyl acrylate and methacrylate, ethyl acrylate and methacrylate, 2-ethylhexyl acrylate and methacrylate, stearyl acrylate and methacrylate, and amino alkyl acrylates and methacrylates, i.e., dimethyl aminoethyl acrylate and methacrylate, diethyl aminoethyl methacrylate, dimethyl aminopropyl acrylate or methacrylate and t-butyl aminoethyl acrylate or methacrylate; N-vinyl amides such as N-vinyl pyrrolidone and N-vinyl-N-methyl formamide; vinyl esters of saturated carboxylic acids wherein acid group has one to 18 carbon atoms (vinyl alkanoates) such as vinyl acetate, vinyl formate, vinyl propionate, vinyl butyrate, vinyl stearate, and the hydrolyzed product therefrom (vinyl alcohol); vinyl halides such as vinyl chloride and vinyl fluoride; vinylidene halides such as vinylidene chloride; vinyl alkyl ethers where alkyl is one to eight carbons such as methyl vinyl ether, n-butyl vinyl ether isobutyl vinyl ether; acrylonitrile and methacrylonitrile; epoxy and hydroxy substituted vinyl alkyl ethers or hydroxy substituted esters of unsaturated mono- or dicarboxylic acids such as hydroxyoctyl acrylate, hydroxyethyl methacrylate, hydroxypropyl methacrylate, hydroxybutylvinyl ether and glycidyl methacrylate; and vinyl aromatics such as styrene, vinyl naphthalene, alkyl (one to eight carbons) and halogen substituted styrene and vinyl naphthalene such as o-methyl styrene, p-chloro styrene or 2-vinyl pyridine.

The free-radical polymerization catalyst employed in the process can be any of those commonly used in the polymerization of ethylene such as the peroxides, the azo compounds, the peresters or the percarbonates. Selected compounds within these groups are dilauroyl peroxide, ditertiary butyl peroxide, tertiary butyl perisobutyrate, tertiary butyl peracetate, $\alpha,\alpha'$-azobisisobutyronitrile, benzoyl peroxide and other compounds of comparable free-radical activity. Usually, the catalyst will be dissolved in a suitable inert organic liquid solvent such as benzene, kerosene, mineral oil or mixtures of solvents. The usual catalyst level is used, i.e., about 25 to 2,500 p.p.m., preferably about 75 to 500 p.p.m., based on the weight of the monomers fed to the reactor, and ranging from the low side to the high side as the amount of sulfur dioxide is increased.

The copolymers of the present invention are random except that they are essentially free of 1:1 molar ethylene and sulfur dioxide (the group $- SO_2 - CH_2 - CH_2 - SO_2 -$ does not appear in the polymer chain). It is important to the understanding of the present invention to appreciate the significance of the term random when applied to the copolymerization of three (or more) copolymerizable monomers A, B and C. A random copolymer is one for which the copolymerization has proceeded in such a way that, for any point in a polymer chain, the probability that the next monomer unit is A, B or C is the same as the molar ratio of A:B:C in the total polymer, for any polymer chain selected. Thus, there should be chain groups of A—A—A—B, A—C—B—B, B—C—C—A—C, and any other combination that is predicted by random statistics. The present copolymers, however, differ from random in two important respects: (1) there are no segments which have adjacent sulfur dioxide groups (because sulfur dioxide does not homopolymerize), and (2) there are essentially no segments where the sulfur dioxide groups are separated by only one ethylene group. With the exception of these two aspects of bias on randomness, the present copolymers are essentially random. Besides being essentially random, the copolymers of the invention are also essentially homogeneous, i.e., all of the chains of a given molecular weight statistically have the same molar ratios of ethylene, sulfur dioxide and the third copolymerizable monomer.

The ethylene copolymers of the present invention can be used for making self-supporting film, cable jacketing and conduit, and used in many polyethylene application areas. Copolymer properties and resulting end-use applications can be varied by varying the melt index or by varying the sulfur dioxide and/or the amount and nature of the third copolymerizable monomer. Melt indices can be between 0.1 and 3000, preferably between 1 and 200.

It is important to appreciate with respect to the use of the present ethylene copolymers that the presence of the sulfur dioxide group in the polymer has a relatively small effect on the physical properties of the polymer made, these physical properties being such things as the stiffness, tensile strength and softening temperature. The change in such properties from the parent polyethylene behavior is determined by the effect obtained by the amount and nature of the additional copolymerizable monomer or monomers. Thus, one finds a change in properties when the percent of the third monomer such as vinyl acetate is changed from 0 to 40 percent. However, the inclusion of an additional 12 percent sulfur dioxide has very little change on the physical properties. This effect which enables the polarity of the polymer to be controlled and increased (by the addition of sulfur dioxide) without a change in the other physical properties, is an important advantage of the invention. This is in contrast to the case in which the polarity of the polymer is increased by adding an additional amount of a polymerizable monomer such as vinyl acetate or methyl methacrylate.

The ethylene copolymers of the present invention are particularly useful for blending with other solid organic polymers, especially those that have polar characteristics, such as polyvinyl chloride and nitrocellulose polymers, to improve properties of the blend polymer. Generally, the copolymers can be blended with the blend polymer (in any order of addition) by any of the usual techniques such as solution blending, or melt blending on a roll mill, in an extruder or in a Banbury mixer, and the polymer composition thereby formed contains a compatible amount of the blend polymer and copolymer of the present invention, i.e., the blend can be in the range of from 1 to 99 percent by weight of the ethylene copolymer and from 99 to 1 percent by weight of the blend polymer. If it is desired to use a low molecular weight ethylene copolymer which is tacky, its handling characteristics can be improved by initially blending about 1 to 20 percent of the blend polymer with the ethylene copolymer and then mixing in additional amounts of the blend polymer when desired. Usually, for most end-use applications of the blended polymeric composition, the composition will contain about 5 to 65 percent by weight of the copolymer and 95 to 35 percent by weight of the blend polymer. The particular compatible level of copolymer added will depend upon the particular blend polymer used, the copolymer used and the physical properties desired in the shaped articles formed from the blend. However, if it is desired to only impart some polarity to the blend polymer, the blended polymeric composition will contain about 1 to 5 percent by weight of the ethylene copolymer.

It is important for the purpose of this invention to understand the nature of blends of high polymers and the advantages to be obtained from such blends. Blends of high polymers can be divided into three broad categories. The first category comprises blends which are compatible in the purest sense, i.e., on a molecular scale; the second, blends which are not completely compatible on a molecular scale but which have a sufficient degree of molecular compatibility or molecular interaction to provide useful polymeric materials. Polymer blends presently available which typify such behavior are those commercial materials such as the ABS resins, or high impact strength grades of polystyrene. The third category of polymer blends are those for which the compatibility of the two polymeric systems involved is so low that there is no useful behavior. Such systems are found when two blends are made from two strong materials but for which the blends are brittle and tear quite easily. The present invention applies to the first two broad categories. The presence of the sulfur dioxide in the copolymer may enable a particular blend system to obtain complete molecular compatibility and thus obtain clear products having high strength and toughness. In other systems, the presence of the sulfur dioxide in the copolymer can allow sufficient molecular interaction between the two polymers so that the blends have useful behavior with reasonably high physical strength in spite of the fact that they are hazy or translucent, indicating a degree of heterogeneity.

The blend polymers used for preparing the polymeric compositions can be any solid organic polymer especially those compatible with the sulfur dioxide containing copolymers as described above, but it is preferred that the polymer have polar characteristics, which is indicative that the sulfur dioxide-containing ethylene interpolymer of the present invention will be compatible therewith on a molecular scale (clear). Blend polymers that can be used are polyamides; cellulose-derived polymers such as cellulose acetate, propionate, butyrate, regenerated cellulose and nitrocellulose; vinyl halide polymers in which the vinyl halide is at least 80 percent by weight of the polymer such as polyvinyl chloride, copolymers of vinyl chloride with olefins (ethylene and propylene particularly), vinyl acetate, and vinyl ethers, vinylidene halide polymers such as polyvinylidene fluoride and a copolymer of vinylidene chloride and vinyl chloride; alpha olefin based polymers having two to 12 carbon atoms such as polyethylene, polypropylene, chlorosulfonated polyethylene, chlorinated polyethylene as well as other halogenated polyolefins, ionomers (ethylene/(meth)acrylic acid copolymers neutralized with an alkali metal hydroxide), ethylene/vinyl ester copolymers (i.e., vinyl ester of saturated carboxylic acid such as vinyl acetate, vinyl propionate, vinyl butyrate, vinyl stearate) of about 15 to 98 percent vinyl ester and hydrolyzed polymers derived therefrom (ethylene/vinyl alcohol), polymers of styrene such as styrene/methacrylic acid, styrene/acrylonitrile; polymers of acrylonitrile such as polyacrylonitrile, copolymers of at least 40 percent acrylonitrile using other ethylenically unsaturated comonomers such as vinyl acetate, vinyl chloride, ethylene and isobutylene; acrylics such as alkyl esters of ethylenically unsaturated carboxylic acids such as alkyl acrylates and alkyl methacrylates wherein the alkyl group is from one to 18 carbon atoms; polyesters such as polyethylene terephthalate and poly-1,4,cyclohexalene dimethylene terephthalate; polyurethanes; polycarbonates; phenolics; polysulfones; epoxy resins; chlorinated polyethers; alkyd resins; acetal resins; ABS resins; silicone resins; tars (asphalt) and waxes such as the petroleum waxes (paraffin wax and microcrystalline wax) and chlorinated waxes.

In making shaped articles from either the ethylene copolymers or the blended polymeric compositions, other materials can be added to perform their usual functions. For instance, anti-oxidants, ultraviolet light stabilizers, plasticizers, and pigments can be used. When the ethylene co-polymer is used with the usual monomeric or low molecular weight plasticizers such as the phthalates, adipates, phosphites and azaleates, the two materials can be used in any proportion. For instance, dioctyl phthalate as a plasticizer can be used at a concentration of up to 30 percent by weight of the composition or the composition can contain up to 40 percent by weight of a polyadipate.

The invention is further illustrated by the following examples in which parts and percentages are by weight unless otherwise indicated.

EXAMPLES 1 TO 28

Copolymers of ethylene, sulfur dioxide and a third copolymerizable, ethylenically unsaturated organic monomer were prepared by admixing ethylene with a mixture of the third monomer and sulfur dioxide and feeding the mixture at the weight ratios shown in Table I into a 700 cc. highly stirred reaction vessel together with a catalyst fed at a rate sufficient to obtain the desired conversion. In the various examples, the temperature of the reactor was maintained between 145°C. and 195°C. and the pressure between 24,000 psi and 30,000 psi. Reactor conversion ranged between 2.8 percent and 19.4 percent and reactor residence time between 3.1 and 4.5 minutes. The reaction conditions and the resulting copolymer compositions for each example are shown in Table I. The reaction mixture was dis-charged from the reactor and subsequent processing was carried out, as previously described, by removing unreacted monomer and cooling the molten polymer and cutting it into pellets. Melt index of the polymers was determined according to ASTM D 1238-65T, condition E (or condition A or D and calculated for comparison with values by condition E in the case of Examples 1, 5, 6, 7, 9, 10, 11, 14, 23, 25, 27, 28 — cond. A, and 8, 24 — cond. D).

In addition to the procedure described above, some of the examples were modified as follows:

1. For Examples 1–9, 12 and 13, the vinyl acetate monomer contained 50 parts per million of butylated hydroxy toluene as stabilizer, based on the weight of vinyl acetate;
2. For Examples 16–20, about 200 parts per million of hydroquinone was added to the methyl methacrylate, based on the weight of methyl methacrylate;
3. For Example 11, the sulfur dioxide was dissolved in the vinyl acetate at a concentration of 80 g./l.;
4. For Examples 14 and 15, the sulfur dioxide was added as a solution in a 60/40 weight mixture of benzene and cyclohexane at a concentration of 44 g./l.; and
5. For Example 10, the sulfur dioxide was added as a solution in a 60/40 weight mixture of benzene and cyclohexane at a concentration of 50 g./l.

TABLE I

Copolymers of ethylene, sulfur dioxide and various ethylenically unsaturated organic compounds

| Example Number | Copolymer type | Comonomer ratio wt. percent | MI | Synthesis conditions ||||||
|---|---|---|---|---|---|---|---|---|---|
| | | | | Pressure (p.s.i.) | Temperature, °C. | Percent conversion | Catalyst | Catalyst concentration | Feed ratio, E/X/SO$_2$, parts by wt. | Residence time |
| 1 | E/VA/SO$_2$ | 48/35/17 | 230 | 24,000 | 170 | 2.8 | Vazo* | 10 g./10 lb. benzene | 10/5.75/0.27 | 4 min. |
| 2 | E/VA/SO$_2$ | 77.5/14/8.5 | 5.5 | 24,000 | 170 | 10.0 | do | 6 g./10 lb. benzene | 10/2/0.10 | 4 min. |
| 3 | E/VA/SO$_2$ | 67.2/14/18.8 | 46.5 | 24,000 | 170 | 10.3 | do | do | 10/1.95/0.21 | 4 min. |
| 4 | E/VA/SO$_2$ | 61/15/24 | 0.11 | 24,000 | 170 | 9.9 | do | do | 10/2.0/0.29 | 4 min. |
| 5 | E/VA/SO$_2$ | 61/32/7 | 48 | 24,000 | 170 | 9.3 | do | 10 g./10 lb. benzene | 10/6.1/0.11 | 4 min. |
| 6 | E/VA/SO$_2$ | 58/30/12 | 65 | 24,000 | 170 | 10.0 | do | do | 10/6.5/0.20 | 4 min. |
| 7 | E/VA/SO$_2$ | 46/41/13 | 160 | 24,000 | 170 | 10.4 | do | do | 10/6.9/0.20 | 4 min. |
| 8 | E/VA/SO$_2$ | 60/14/26 | 67 | 24,000 | 170 | 10.8 | do | 6 g./10 lb. benzene | 10/1.9/0.31 | 4 min. |
| 9 | E/VA/SO$_2$ | 58/36/6 | 85 | 24,000 | 170 | 9.7 | do | 10 g./10 lb. benzene | 10/7.1/0.11 | 4 min. |
| 10 | E/VA/SO$_2$ | 59/37/4 | 750 | 24,000 | 170 | 18.8 | t-butylperoxy isobutyrate. | 13.5 g./9 lb. benzene plus 1 lb. cyclohexane. | 10/7.0/0.19 | 4 min. |
| 11 | E/VA/SO$_2$ | 52/40/8 | 210 | 24,000 | 174 | 19.4 | do | do | 10/10/0.8 | 4.5 min. |
| 12 | E/VA/SO$_2$ | 57/21/22 | 0.24 | 24,000 | 170 | 10.6 | Vazo | 6 g./10 lb. benzene | 10/2.1/0.32 | 4 min. |
| 13 | E/VA/SO$_2$ | 71/22/7 | 40 | 24,000 | 170 | 10.4 | do | 12 g./10 lb. benzene | 10/4.6/0.09 | 4 min. |
| 14 | E/VA/SO$_2$ | 55/40/5 | 175 | 24,000 | 145 | 8.3 | t-butylperoxy pivalate. | 4.5 g./7.5 lb. benzene plus 2.5 lb. cyclohexane. | 10/9.4/0.11 | 3.8 min. |
| 15 | E/VA/SO$_2$ | 67/21/12 | 8.0 | 24,000 | 175 | 5.0 | t-Butylperoxy isobutyrate. | 4.5 g./7.5 lb. benzene plus 2.5 lb. cyclohexane. | 10/4.9/0.079 | 3.1 min. |
| 16 | E/MMA/SO$_2$ | 77/15/8 | 1.1 | 24,000 | 170 | 10.2 | Vazo | 6 g./10 lb. benzene | 10/0.60/0.100 | 4 min. |
| 17 | E/MMA/SO$_2$ | 68/14/18 | 3.9 | 24,000 | 170 | 10.8 | do | 10 g./10 lb. benzene | 10/0.60/0.20 | 4 min. |
| 18 | E/MMA/SO$_2$ | 62/13/25 | 12.9 | 24,000 | 170 | 11.0 | do | 20 g./10 lb. benzene | 10/0.65/0.31 | 4 min. |

TABLE I — Continued

Copolymers of ethylene, sulfur dioxide and various ethylenically unsaturated organic compounds

| Example Number | Copolymer type | Comonomer ratio wt. percent | MI | Pressure (p.s.i.) | Temperature, °C | Percent conversion | Catalyst | Catalyst concentration | Feed ratio, E/X/SO₂ parts by wt. | Residence time |
|---|---|---|---|---|---|---|---|---|---|---|
| 19 | E/MMA/SO₂ | 62/25/13 | 11.1 | 25,400 | 178 | 10.1 | t-butyl peroxy isobutyrate | 8 g./10 lb. benzene | 10/0.90/0.16 | 4 min. |
| 20 | E/MAA/SO₂ | 69/11/20 | 3.4 | 24,000 | 170 | 10.87 | Vazo* | 20 g./10 lb. benzene | 10/0.50/0.20 | 4 min. |
| 21 | E/HEMA/SO₂ | 72/18/10 | 6.8 | 24,000 | 170 | 9.7 | ...do... | 15 g./10 lb. benzene | 10/0.30/0.10 | 4 min. |
| 22 | E/HEMA/SO₂ | 59/34/11 | 2.3 | 24,000 | 170 | 11.11 | ...do... | ...do... | 10/0.50/0.13 | 4 min. |
| 23 | E/EA/SO₂ | 59/29/12 | 140 | 24,000 | 170 | 10.1 | ...do... | 6 g./10 lb. benzene | 10/1.30/0.12 | 4 min. |
| 24 | E/EA/VA/SO₂ | 55/20/13/12 | 42 | 24,000 | 170 | 10.1 | ...do... | 8 g./10 lb. benzene | 10/0.33/2.92/0.14 | 4 min. |
| 25 | E/AN/SO₂ | 86/10/4 | 570 | 30,000 | 195 | 6.1 | t-Butylperoxy isobutyrate | 9 g./9 lb. benzene plus 1 lb. cyclohexane | 10/0.2/0.08 | 3.4 min. |
| 26 | E/AN/SO₂ | 91/6.5/2.5 | 3.5 | 30,000 | 190 | 9.9 | ...do... | ...do... | 10/0.2/0.08 | 3.4 min. |
| 27 | E/DMAEMA/SO₂ | 65/30/5 | 1,810 | 24,000 | 165 | 9.9 | ...do... | ...do... | 10/0.46/0.08 | 3.4 min. |
| 28 | E/VF/SO₂ | 82/9/9 | .98 | 24,000 | 200 | 12.3 | ...do... | 0.14 g. /9 lb. benzene plus 1 lb. cyclohexane | 10/1.3/0.17 | 3.4 min. |

VA=vinyl acetate; VF=vinyl fluoride; MMA=methyl methacrylate; MAA=methacrylic acid; HEMA=hydroxyethyl methacrylate; EA=ethylacrylate; AN=acrylonitrile; DMAEMA=dimethylaminoethyl methacrylate.
*=azo bis-isobutyronitrile.

All of the polymers prepared in Examples 1–28 are random except that the polymers are essentially free of a 1:1 molar ratio of ethylene and sulfur dioxide groups and adjacent sulfur dioxide groups.

The ethylene/vinyl acetate/sulfur dioxide terpolymers of Examples 6 and 13 were subjected to fractionation studies to determine their homogeneity using the fractionation procedure and apparatus set forth in "Extraction Fractionation of Polyvinyl Acetate and of Polyvinyl Alcohol", A. Beresniewicz, *J. Polymer Science*, Vol. 35, pp. 321–333, 1959. Fractionations were conducted at about 30°C. using chloroform as the solvent (benzene for Example 13 terpolymer) and heptane as the non-solvent with an extraction time for each fraction of 20 min. The total weight of polymer on the screen was 1.86 g. of which 98.5 percent was recovered for Example 6 and 1.79 g. of which about 106 percent was recovered for Example 13.

Inherent viscosities of each fraction and of the whole polymer were conducted in chloroform at 30°C. at a concentration of 0.25 g./100 ml. (in benzene for Example 13 polymer). The inherent viscosity for the polymer of Example 6 was 0.7 and of Example 13 was 0.84. Since the sum of the products of the weight fraction for each fraction times its inherent viscosity was approximately equal to the inherent viscosity of the respective whole polymer, the fractionation in each case was considered good.

To determine homogeneity, the whole polymer of each example and the fractions thereof were subjected to oxygen and sulfur analyses. The sulfur analysis was conducted by burning the polymer in a Wickwold oxyhydrogen flame decomposition unit using 2 ml. of 30 percent hydrogen peroxide in 80 ml. of distilled water as the receiving vessel. After the polymer was burned, the burner and receiving vessel were rinsed with distilled water. After diluting the receiving vessel to 200 ml. with distilled water, a 50 ml. aliquot was taken and placed in a 250 ml. beaker to which was added 90 ml. of isopropanol and 8 ml. of a 0.01 percent solution of thorin in methanol as the colorimetric indicator. The aliquot was placed in a Sargeant Automatic Spectro Titrator adjusted to 520 millimicrons and titrated spectrophotometrically at the 250 millivolts scale using a 0.05 N solution of barium perchlorate as titrant. The percent sulfur is titrated automatically and recorded on a recorder attached to the titrator.

Oxygen analysis was conducted as described in "Routine Direct Determination of Oxygen In Organic and Inorganic Compounds Via Inert Gas Fusion", Susan K. Smith and D. W. Krause, *Analytical Chemistry*, Vol. 40, November, 1968, p. 2.034.

For the Example 6 polymer, the sulfur content of the whole polymer was about 5.1 percent by weight and the sulfur contents of the fractions all (except one) were between 4.6 percent and 5.9 percent, which corresponds to a narrow range of sulfur dioxide. The oxygen content of the whole polymer was about 15.3 percent by weight and the oxygen content of each fraction was between 15 and 16 percent, which would correspond to a range of 29 to 31 percent vinyl acetate.

For the Example 13 polymer, the sulfur content of the whole polymer was about 3 percent by weight and the sulfur contents of the fractions were mostly between 2 percent and 3.5 percent, which corresponds to a narrow range of sulfur dioxide. The oxygen content of the whole polymer was about 11.5 percent by weight and the oxygen content of each fraction was mostly between 11 percent and 12.5 percent, which would correspond to a range of about 21 to 24 percent vinyl acetate.

These fractionation studies show that the essentially random polymers of Examples 1 to 28 are essentially homogeneous, i.e., they exhibit nonblockiness. Otherwise, the samples would be fractionated steeply according to SO₂ content.

EXAMPLE 29

An E/VAc/SO₂ terpolymer (58/36/6 composition by wt. percent) prepared as in Example 9, but having a Melt Index of 112, was methanolyzed by the following procedure.

Two hundred grams of the E/VAc/SO₂ terpolymer was added to a 3-neck round bottom flask containing one liter of absolute methanol and 120 ml. of a 25 percent solution of sodium methylate in methanol. The flask was equipped with a stirrer, reflux condenser and nitrogen inlet. The E/VAc/SO₂ terpolymer was cut into small bits (ca three-sixteenth inch × three-sixteenth inch × three-sixteenth inch) before addition and added with rapid stirring and under a nitrogen blanket. After addition was complete, the reaction mixture was held at 25°C. for 1 hr. Heat was then slowly applied by means of a hot water bath and programmed over the period of 1 hr. to the boil (60°C.). The reaction was refluxed for 6 hrs. After cooling to room temperature, with vigorous stirring, the product was filtered off and washed for 3 hrs. at 35° to 40°C. with 20 ml. acetic acid in 2 liters of absolute methanol. The product was filtered and dried overnight at 85°C. in an oven at full vacuum. Pale yellow beads (158.7 g.) were obtained. Infrared analysis indicated 0.82 percent residual vinyl acetate. The melt index was 61.7, T°m was 109°C. and Δ Hf was 20.9 cal./g. The resultant ethylene/vinyl alcohol/$SO_2$ terpolymer composition was 70/23/7 by wt.

EXAMPLES 30 TO 32

The oil resistance of adhesive bonds was determined on laminate bonds formed by bonding two aluminum strips (1 inch wide), using the polymers of Examples 1, 17 and 20, in a press at 10,000 psi and 150°C. to form an innerlayer 10 mils thick. Peel strengths were tested on an Instron tester (T-Peel) at 2 inches/min. crosshead speed both before immersion and after immersion in SAE 30 MS high detergency motor oil for 3 days at about 70°C. The results are shown in Table II.

TABLE II

Bond Strengths of Aluminum to Aluminum Bond After Immersion in Motor Oil

| | | Peel Strength – lb./in. | |
| --- | --- | --- | --- |
| Example No. | Terpolymer Adhesive (Ex.No.) | Before Immersion | After Immersion |
| 30 | (1)–35VA/17$SO_2$ | 6.2 | 6.9 |
| 31 | (17)–14MMA/18$SO_2$ | 1.4 | 1.4 |
| 32 | (20)–11MAA/20$SO_2$ | 2.5 | 2.2 |

These results show that the copolymers of the invention have very high oil resistance, especially at a high level of sulfur dioxide, i.e., over 15 percent.

EXAMPLES 33 TO 41

The oil resistance of the copolymers of the invention was further demonstrated by determining the resistance to oil pick-up. Using the terpolymers of Examples 2, 3, 4, 15, 17 and 20 and an ethylene/vinyl acetate copolymer (18 percent vinyl acetate — "Elvax" 460) as a control, sheets 1 inch × 3 inches × 40 or 60 mils in thickness were melt pressed at 40,000 lbs. force in the usual manner. These sheets were weighed, immersed in various oils at 60°C. and weighed from time-to-time to determine oil pick-up. The results are shown in Table III.

Table III shows that the control had an oil pick-up of 38 percent only after 2 hrs. in the mineral oil, whereas the sulfur dioxide containing polymers of the invention had varying degrees of oil pick-up depending on the level of sulfur dioxide in the polymer. It is seen that the terpolymers containing up to about 15 percent $SO_2$ had a moderate degree of oil resistance whereas terpolymers containing more than 15 percent $SO_2$ had excellent oil resistance.

TABLE III

Oil Resistance of $SO_2$ Polymers Percent Oil Pick-Up

| Example No. | Polymer used (Ex. No.) | Type Oil | % Oil Pick-Up | Time |
| --- | --- | --- | --- | --- |
| Control | EVA | Mineral | 38 | 2 hrs. |
| 33 | (15)–21VA/12$SO_2$ | Corn | 37 | 6 " |
| 34 | " | Linseed | 37 | " " |
| 35 | " | Mineral | 51 | " " |
| 36 | " | Lard | 33 | 5 " |
| 37 | (2)–14VA/8.5$SO_2$ | Mineral | 16.6 | 26 " |
| 38 | (3)–14VA/18.8$SO_2$ | " | 3.4 | " " |
| 39 | (4)–15VA/24$SO_2$ | " | 4.9 | " " |
| 40 | (17)–14MMA/18$SO_2$ | " | 6.3 | " " |
| 41 | (20)–11MAA/20$SO_2$ | " | 0.2 | " " |

EXAMPLES 42 AND 43

Using the procedures of Examples 1 to 28, ethylene/vinyl acetate/sulfur dioxide terpolymers were made and extruded at 210°C. into films 4 mils and 2 mils in thickness, respectively. The terpolymers and their film properties are shown in Table IV.

TABLE IV

| | Example No. | |
| --- | --- | --- |
| | 42 | 43 |
| E/VA/$SO_2$ wt. % | 74/20/6 | 84/10/6 |
| Melt Index | 2.2 | 1.85 |
| Modulus, psi MD | 9,300 | 14,100 |
| Modulus, psi TD | 6,000 | 11,500 |
| Elongation, % MD | 245 | 210 |
| Elongation, % TD | 720 | 680 |
| Tensile strength, psi MD | 3,100 | 3,500 |
| Tensile strength, psi TD | 3,300 | 2,600 |
| Elmendorf tear strength, g./mil. MD | 63 | 144 |
| Elmendorf tear strength, g./mil. TD | 375 | 215 |
| Water vapor transmission rate[1] | 25 | 10 |
| Oxygen permeability rate[2] | 790 | 570 |
| Carbon dioxide permeability[2] | 5,540 | 3,400 |

(1) g. × mils thickness/day × 100 in.$^2$ × atm. – ASTM E–96 Proc. E
(2) g. × mils thickness/day × 100 in.$^2$ – ASTM D–1434–66

EXAMPLES 44 TO 61

Using the ethylene/vinyl acetate/sulfur dioxide terpolymers of Examples 5, 6, 7 and 9, the terpolymers were mill blended on a 3-inch roll mill with various vinyl chloride polymers at about 190°C. or 170°C., depending upon the melting point of the vinyl chloride polymer used, for about 20 minutes. The vinyl chloride polymer was first banded to the mill and then the terpolymer added about 2 g. at a time. Sufficient time was allowed between additions to enable the polymer to blend with the vinyl chloride polymer. After all of the terpolymer had been added to the mill, milling was continued for about 10 minutes. The blend was taken off the hot mill and sheeted out by running it through a mill maintained at room temperature. The blends, which were all clear, were then made into the standard compression molded bars for physical testing. The bars were molded at about the same temperature at which they were milled by placing the blend sample in a hot press, allowing the sample to heat for 2 to 3 minutes and then applying a pressure of about 40,000 lbs. force. After about 2 to 3 minutes at pressure, the sample is cooled in the press. The results are shown in Table V.

TABLE V

Clear vinyl chloride polymer blends with E/VA/SO₂ terpolymers, effect of concentration

| Example number | PVC terpolymer ratio | PVC type | E/VA/SO₂ (Ex. No.) | Izod impact, ft. lbs./in.[1] | Flex modulus, p.s.i.[2] | Yield strength p.s.i.[3] | Tensile strength p.s.i.[3] | Percent elongation[3] | Tensile impact[4], ft. lbs./in. | Heat distortion T°C.[5] |
|---|---|---|---|---|---|---|---|---|---|---|
| 44 | 90/10 | PVC ("Vygen" 110) | (7) 46/41/13 | 0.70 | 371,000 | 8,190 | 8,190 | 120 | 52.3 | 54 |
| 45 | 85/15 | do | (7) 46/41/13 | 0.77 | 361,000 | 8,115 | 8,115 | 150 | 46.5 | 51 |
| 46 | 80/20 | do | (7) 46/41/13 | 0.82 | 343,000 | 7,815 | 7,815 | 165 | 41.3 | 45 |
| 47 | 75/25 | do | (7) 46/41/13 | 0.79 | 321,000 | 7,390 | 7,655 | 160 | 60.4 | 44 |
| 48 | 90/10 | 94% VCl/6% propylene | (7) 46/41/13 | 0.57 | 388,000 | 7,950 | 7,950 | 150 | | |
| 49 | 85/15 | do | (7) 46/41/13 | 0.54 | 386,000 | 7,980 | 7,980 | 150 | | |
| 50 | 80/20 | do | (7) 46/41/13 | 0.55 | 374,000 | 7,520 | 7,520 | 150 | | |
| 51 | 75/25 | do | (7) 46/41/13 | 0.53 | 343,000 | 7,880 | 7,880 | 180 | | |
| 52 | 90/10 | PVC ("Vygen" 110) | (9) 58/36/6 | 2.53 | 258,000 | 5,535 | 6,685 | 120 | | 59 |
| 53 | 85/15 | do | (9) 58/36/6 | *5.05 | 200,000 | 4,440 | 6,240 | 140 | | 50 |
| 54 | 80/20 | do | (9) 58/36/6 | *5.26 | 148,000 | 3,615 | 6,090 | 160 | | |
| 55 | 75/25 | do | (9) 58/36/6 | *5.27 | 116,000 | 3,150 | 5,745 | 170 | | |
| 56 | 90/10 | do | (5) 61/32/7 | *3.90 | 265,000 | 5,555 | 6,712 | 130 | | |
| 57 | 85/15 | do | (5) 61/32/7 | *4.70 | 200,000 | 4,321 | 5,911 | 130 | | |
| 58 | 90/10 | do | (6) 57/30/13 | 0.52 | 349,000 | 7,884 | 7,884 | 110 | | |
| 59 | 85/15 | do | (6) 57/30/13 | 0.56 | 333,000 | 7,411 | 7,411 | 145 | | |
| 60 | 90/10 | 90% VCl/10% VA (Bakelite VYNS) | (5) 61/32/7 | 0.58 | 303,000 | 5,176 | 5,771 | 155 | | |
| 61 | 85/15 | do | (5) 61/32/7 | 1.80 | 260,000 | 4,119 | 5,352 | 175 | | |

[1] ASTM D 256-56.
[2] ASTM D 790-66 Tangent modulus of elasticity.
[3] ASTM D 1708-66 1"/min. crosshead.
[4] ASTM D 1822-61T.
[5] ASTM D 648-56 264 p.s.i.
* Samples did not break, but bent when struck by 10 ft. lb. arm.

These results show that stiff, tough products can be obtained with 10-25 percent of the terpolymer in the blend. Such results can be obtained when the sulfur dioxide varies from 6-13% and the termonomer can vary from 30-41 percent.

EXAMPLES 62 TO 73

A. To compare the flexibilizing behavior of the copolymers of the present invention with commercial additives used to flexibilize polyvinyl chloride (dioctyl phthalate and "Paraplex" G 54 sold by Rohm and Haas Co. which is a low molecular weight adipate polyester), 50/50 blends of polyvinyl chloride ("Vygen" 110 sold by The General Tire Co.) with some of the ethylene/vinyl acetate/sulfur dioxide terpolymers of Examples 1 to 13 were mill blended as done in Examples 44 to 61. The commercial additives were mill blended at the levels commonly commercially used for such additives. The blends were made into compression-molded bars for physical testing. The results are shown in Table VI.

limpness comparable to commercial additive blends (about 1,300 psi for the 100 percent secant modulus) can be obtained while obtaining considerably higher tensile strengths and tear strengths.

B. The blends of Examples 70 and 72 and Controls 2 and 3 were all subjected to an abrasion resistance test. The test was carried out in accordance with ASTM D-1044-56 modified using H-18 wheels and a 500 g. weight. The weight loss in g./100 cycles was 0.115 for Example 70 and 0.095 for Example 72; whereas for Control 2 the weight loss was 0.148 and for Control 3 the weight loss was 0.129. Thus, the blends containing the sulfur dioxide terpolymers of the present invention were better in resistance to abrasion than commercially available polyvinyl chloride flexibilized with either dioctyl phthalate or "Paraplex" G 54.

C. The blends of Examples 64, 70, 71 and 72 and Controls 2 and 3 were subjected to tests to determine the extractibility of the additive from the blend. Also

TABLE VI

Flexible PVC blends, physical properties, 50/50 blends, polyvinyl chloride E/VA/SO₂

| Example No. | PVC/additive ratio | E/VA/SO₂ (Ex. No.) | Blend clarity | 100% sec. modulus p.s.i.[1] | Tensile strength, p.s.i.[2] | Percent elongation[2] | Elmendorf tear, g./mil.[3] | Hardness Shore "A"[4] |
|---|---|---|---|---|---|---|---|---|
| 62 | 50/50 | (1) 48/35/17 | Exc | 2,317 | 4,121 | 235 | 373 | |
| 63 | 50/50 | (11) 52/40/8 | Exc | 1,386 | 3,015 | 320 | 305 | |
| 64 | 50/50 | (1) 48/35/17 | Exc | 2,977 | 4,642 | 200 | | |
| 65 | 50/50 | (3) 67/14/19 | Exc | *2,554 | 4,803 | 290 | | |
| 66 | 50/50 | (2) 78/14/8 | Haze | | | | | |
| 67 | 50/50 | (12) 57/21/22 | Exc | | | | | |
| 68 | 50/50 | (7) 46/41/13 | Exc | | | | | |
| 69 | 50/50 | (11) 52/40/8 | Exc | | | | | |
| 70 | 50/50 | (9) 58/36/6 | Exc | 1,366 | 3,861 | 265 | 241 | 82 |
| 71 | 50/50 | (5) 61/32/7 | Exc | 1,592 | 4,208 | 275 | 200 | 89 |
| 72 | 50/50 | (6) 57/30/13 | Exc | 1,404 | 4,567 | 265 | 267 | 93 |
| 73 | 50/50 | (13) 71/22/7 | Good | 1,835 | 4,050 | 335 | | |
| Control 1 | 50/50 | E/VA(35/65) | do | 768 | 3,440 | 215 | 231 | |
| Control 2 | 67/33 | DOP | do | 1,330 | 3,010 | 300 | 227 | 91 |
| Control 3 | 57/43 | "Paraplex" G 54 | do | 1,200 | 2,460 | 225 | 136 | 82 |

[1] ASTM D 1708-66 1"/min. crosshead.
[2] ASTM D 1708-66 1"/min. crosshead.
[3] ASTM D 1922-67 10 mil films.
[4] ASTM D 2240-64T.
*Yield strength.

The results of Table VI show that good clarity (compatibility) can be expected when the sum of the percent vinyl acetate plus 5 times the percent sulfur dioxide in the terpolymer is greater than 55. It is also seen that tested were 50/50 blends made up as in (A) above using the terpolymer of Example 23 (E/EA/SO₂ of 59/29/12) and tetrapolymer of Example 24 (E/EA/VA/SO₂ of 55/20/13/12).

Extractibility was measured using a hydrocarbon solvent (hexane), chlorinated solvent (perchlorethylene) and a detergent solution. All samples were conditioned at 23°C. and 50 percent relative humidity for 24 hrs. before weighing and testing, and reconditioned before final weighing.

Perchlorethylene extractions were run at 60°C. for 1 hr. by placing the samples in stirred solvent contained in a glass beaker on a hotplate. The samples were removed, wiped with a paper towel, placed in an air oven at 60°C. for 1 hr., reconditioned and weighed.

Hexane extractions were run at 23°C. for 24 hrs. by placing the samples in 2 oz. glass bottles on a shaker. Samples were then removed, wiped with a paper towel, placed in an air oven at 60°C. for 1 hr., reconditioned and weighed.

Detergent extractions were run with a 1 percent "Tide" solution for 24 hrs. at 60°C. by placing samples in 2 oz. glass bottles containing the heated solution. At the end of the test period, the samples were removed, rinsed with water, wiped with a paper towel, placed in an air oven at 60°C. for 1 hr., reconditioned and weighed.

The results are shown in Table VII:

blends containing dioctyl phthalate and "Paraplex" G-54 in resistance to detergents and solvents. It is also seen that the polymer containing over 10 percent sulfur dioxide gives blends which are highly resistant to perchlorethylene.

EXAMPLES 74 TO 89

Using some of the copolymers of Examples 1 to 28, compatible (clear) blends of the copolymers with other polymers were made by either mill blending as in Examples 44 to 61, melt blending or solution blending. Melt blending was accomplished by heating the blend polymer and the particular terpolymer used above their melting points in a glass beaker with stirring, and solution blending was carried out by dissolving the terpolymer in tetrahydrofuran and the blend polymer in tetrahydrofuran, mixing the two solutions with stirring and then pouring the mixed solution into a shallow box formed from fluoroethylene polymer ("Teflon").

After the terpolymer and blend polymer were blended, films of the blend 10 mils thick were pressed as in Examples 44 to 61. In all cases the films were clear, thus indicating compatibility of the terpolymer with the blend polymer. The results are shown in Table VIII.

TABLE VIII

Compatible blends of sulfur dioxide-containing terpolymers with other polymers

| Example number | Blending method | Blend polymer/ $SO_2$ polymer ratio | Blend polymer | $SO_2$ polymer (Ex. No.) |
| --- | --- | --- | --- | --- |
| 74 | Melt | 75/25 | Polyamide | (2) 78E/14VA/8$SO_2$ |
| 75 | do | 75/25 | do | (3) 67E/14VA/19$SO_2$ |
| 76 | do | 75/25 | do | (4) 61E/15VA/24$SO_2$ |
| 77 | do | 75/25 | do | (1) 48E/35VA/17$SO_2$ |
| 78 | do | 75/25 | do | (16) 78E/14MMA/8$SO_2$ |
| 79 | do | 75/25 | do | (17) 68E/14MMA/18$SO_2$ |
| 80 | do | 75/25 | do | (18) 62E/13MMA/25$SO_2$ |
| 81 | do | 75/25 | do | (20) 69E/11MAA/20$SO_2$ |
| 82 | do | 67/33 | do | (2) 78E/14VA/8$SO_2$ |
| 83 | do | 50/50 | Chlorosulfonated polyethylene | (3) 67E/14VA/19$SO_2$ |
| 84 | do | 50/50 | Nitrocellulose | (9) 58E/36VA/6$SO_2$ |
| 85 | Mill | 50/50 | 6/66/610 nylon | (20) 69E/11MAA/20$SO_2$ |
| 86 | Solution | 75/25 | Poly(methyl methacrylate) | (5) 61E/32VA/7$SO_2$ |
| 87 | do | 67/33 | 55% hydrolyzed copolymer of 60% E/18% VA | (19) 62E/25MMA/13$SO_2$ |
| 88 | do | 80/20 | Copolymer of 75% AN/25% Isobutylene | (6) 57E/30VA/13$SO_2$ |
| 89 | do | 80/20 | Copolymer of 79% AN/21% VA | (6) 57E/30VA/13$SO_2$ |

TABLE VII

Flexible PVC Blends – Extractibility

| Sample No. | PVC/Additive Ratio | Additive | Extractibility-% Wt. Loss Perchlor- ethylene 1 hr. 60°C. | Hexane 24 hr. 23°C. | Detergent 24 hr. 60°C. |
| --- | --- | --- | --- | --- | --- |
| Control 2 | 67/33 | DOP | 24.5 | 27.6 | 1.5 |
| Control 3 | 57/43 | "Paraplex" G54 | 27.2 | 5.8 | 5.7 |
| Ex. 64 | 50/50 | 48E/35VA/17$SO_2$ | +6.1 | +1.3 | 0.2 |
| Ex. 70 | 50/50 | 58E/36VA/6$SO_2$ | 17.3 | 1.5 | 0.3 |
| Ex. 71 | 50/50 | 60E/33VA/7$SO_2$ | 16.2 | 1.6 | 0.2 |
| Ex. 72 | 50/50 | 57E/30VA/13$SO_2$ | 4.8 | 1.0 | 0.1 |
| Ex. 23 Terpolymer + PVC | 50/50 | 59E/29EA/12$SO_2$ | 12.7 | 1.9 | 0.1 |
| Ex. 24 Tetrapolymer + PVC | 50/50 | 55E/20EA/13VA/12$SO_2$ | 1.5 | +0.5 | +0.1 |

The results in Table VII show that all of the sulfur dioxide containing polymer blends are superior to the

What is claimed is:

1. An essentially random ethylene copolymer consisting essentially of at least about 25 percent by weight ethylene, from about 0.1 to 30 percent by weight of sulfur dioxide and from about 0.1 to 55 percent by weight of at least one copolymerizable ethylenically unsaturated organic compound having only one copolymerizable double bond, said polymer being essentially free of groups consisting of two sulfur atoms separated by two carbon atoms.

2. The polymer of claim 1 wherein the copolymerizable, ethylenically unsaturated organic compound is selected from the group consisting of unsaturated mono- or dicarboxylic acids, esters of unsaturated mono- or dicarboxylic acids, vinyl esters of saturated carboxylic acids wherein the acid group has one to 18 carbon atoms, vinyl alcohol, vinyl halides, vinyl alkyl ethers, vinylidene halides, acrylonitrile, methacrylonitrile, alpha olefins of three to 12 carbon atoms, vinyl aromatics, hydroxy or epoxy substituted esters of unsaturated mono- or dicarboxylic acids and hydroxy or epoxy substituted vinyl alkyl ethers.

3. The polymer of claim 2 wherein the polymer contains from about 15 to 30 percent by weight sulfur dioxide.

4. The polymer of claim 2 wherein the polymer contains from about 0.1 to 15 percent by weight sulfur dioxide.

5. The polymer of claim 3 wherein the copolymerizable, ethylenically unsaturated organic compound is vinyl acetate, alkyl acrylate wherein the alkyl group is from one to 18 carbon atoms or alkyl methacrylate wherein the alkyl group is from one to 18 carbon atoms.

6. The polymer of claim 4 wherein the copolymerizable, ethylenically unsaturated organic compound is vinyl acetate, alkyl acrylate wherein the alkyl group is from one to 18 carbon atoms or alkyl methacrylate wherein the alkyl group is from one to 18 carbon atoms.

7. The polymer of claim 4 wherein said polymer is at least about 50 percent by weight ethylene, about 0.1 to 45 percent by weight vinyl acetate and about 0.1 to 15 percent by weight sulfur dioxide.

8. The polymer of claim 4 wherein said polymer is at least about 50 percent by weight ethylene, about 0.1 to 35 percent by weight alkyl acrylate or methacrylate wherein the alkyl group is from one to 18 carbon atoms and about 0.1 to 15 percent by weight sulfur dioxide.

9. The ethylene copolymer of claim 1 in the form of a shaped article.

10. The ethylene copolymer of claim 3 in the form of a shaped article.

11. The ethylene copolymer of claim 4 in the form of a shaped article.

12. A process for preparing an ethylene copolymer comprising: (1) continuously reacting ethylene, sulfur dioxide and at least one copolymerizable, ethylenically unsaturated organic compound having only one copolymerizable double bond in proportions to provide an essentially random copolymer consisting essentially of at least about 25 percent by weight ethylene, from about 0.1 to 30 percent by weight sulfur dioxide and from about 0.1 to 55 percent by weight of at least one of said copolymerizable organic compounds, in a pressurized, stirred reaction zone maintained at a temperature of at least 140°C., with a free-radical catalyst wherein the contents throughout the reaction zone are kept uniform with respect to the molar ratio of ethylene, sulfur dioxide and said copolymerizable organic compound, (2) continuously separating the copolymer from unreacted ethylene, sulfur dioxide and said copolymerizable organic compound, and (3) continuously discharging said unreacted ethylene, sulfur dioxide and copolymerizable organic compound.

13. The process of claim 12 wherein the pressure is within the range of about 5,000 to 60,000 psi, the temperature is within the range of about 155° to 300°C. and the free-radical catalyst is an azo catalyst or a perester catalyst.

14. The process of claim 13 wherein the copolymerizable, ethylenically unsaturated organic compound is selected from the group consisting of unsaturated mono- or dicarboxylic acids, esters of unsaturated mono- or dicarboxylic acids, vinyl esters of saturated carboxylic acids wherein the acid group has one to 18 carbon atoms, vinyl alcohol, vinyl halides, vinyl alkyl ethers, vinylidene halides, acrylonitrile, methacrylonitrile, alpha olefins of three to 12 carbon atoms, vinyl aromatics, hydroxy or epoxy substituted esters of unsaturated mono- or dicarboxylic acids and hydroxy or epoxy substituted vinyl alkyl ethers.

15. The process of claim 14 wherein the copolymerizable, ethylenically unsaturated organic compound is vinyl acetate, alkyl acrylate wherein the alkyl group is from one to 18 carbon atoms or alkyl methacrylate wherein the alkyl group is from one to 18 carbon atoms.

16. The process of claim 15 wherein the sulfur dioxide is continuously mixed with the copolymerizable organic compound and the mixture continuously fed to said stirred reactor maintained at a pressure within the range of about 20,000 to 35,000 psi and a temperature within the range of about 155° to 225°C.

* * * * *